United States Patent Office 3,261,880
Patented July 19, 1966

3,261,880
UNDER-WATER PAINT
Jean Robert Forestier, Versoix, Switzerland, assignor to Dofag Establishment, Vaduz, Liechtenstein, a firm
No Drawing. Filed Oct. 31, 1960, Ser. No. 65,881
Claims priority, application Switzerland, Oct. 31, 1959, 80,121/59; July 22, 1960, 8,428/60
7 Claims. (Cl. 260—736)

Known paints, considered in the light of their property of forming a solid protector film, may be split into three groups:

(1) Paints in which the film forms through aerial oxidation in the presence of a catalyst, the oxidation being followed by slow polymerization.

This is so for oil-paints, which need aerial oxygen.

(2) Paints in which the film forms by polymerization in the presence of a catalyst or under the action of heat, ultraviolet or infra-red rays, without aerial oxidation. Shelf life for such paints, in ready-to-use condition, is low.

(3) Paints in which the film-forming material is merely dissolved in a solvent and which are if necessary, plasticized. These paints do not need aearial oxygen, the formation of the protective film being effected by the more or less rapid evaporation of the solvent.

Progress during the last few years in free, unattached undersea diving is common knowledge. This technique has allowed work, previously considered impossible, to be carried out and permits painting under water, thus giving a ready answer to the problem of protecting constantly submerged installations.

Paint which can be applied and which will harden under water, which is the object of the present invention comprises, as do the paints of the third group above, a film forming material and a solvent; it is characterized by the fact that the solvent is removed, while the film is hardening, by gradually dissolving in the water in which the painted surface is submerged and not by evaporation. The solvent used in the paint according to the invention dissolves in water at such a speed as to ensure progressive and controlled hardening of the film and a "hors poussiere" formation. This result is obtained by carefully choosing the type and proportion of solvent, the minimum solubility of which in water should be 0.1 g. per litre. The solvent used may be a mixture of many different solvents. According to the water temperature one may then easily modify the solvent to one of greater or less solubility.

To ensure that the film sticks to the submerged surfaces, which may be of ferrous metal, ferrous metal alloy or of concrete, the paint must contain at least one aliphatic amine with more than twelve carbon atoms per molecule (preferably with between fifteen and nineteen carbon atoms per molecule), or an aliphatic diamine.

If oleylamine is used its percentage may vary from 1 to 10 according to the condition of the iron surface which is to be painted and according to the composition of the water.

The film forming material dissolved in the solvent may be a chlorinated rubber whose viscosity (Hoeppler viscometer) is between seventeen and fifty-five centipoises at 20° C. for a twenty percent solution in a mixture of ninety-five percent toluene and five percent butanol. The film forming material may also be made of a mixture of chlorinated rubber and bitumen.

To increase the flexibility of the film a non-saponifiable plasticizer, for example, a chlorinated plasticizer, may be added to the paint. The paint may contain chlorinated naphthalene to increase the impermeability of the film formed. An anticorrosive pigment, such as red lead, zinc chromate, white lead, lead cyanamide, etc., may also be added.

The presence of polar solvents increases the adherence of the paint layer appreciably from the time of actual application, and thus reinforces the action of the amine.

In certain cases it is advantageous to add to the paint zinc oxide and an organophilic bentonite gel. The zinc oxide makes the pigment in the paint less heavy and delays the red lead deposition during storage while the organophilic bentonite gel, which is preferably of the dimethyloctadecylammoniumbentonite type, has by changing viscosity (thixotropy) the property of delaying, or even suppressing altogether the deposition of pigment during storage without injuring the paint adherence. The bentonite is added to the extent of 1.3 to 2.5 percent of the total weight of paint.

It has been found that some solvents, the solubility of which in water is less than 0.1 g. per litre are useful in preparing of the said paint if they are mixed with water-soluble solvents, these last acting as a third solvent entraining the water-insoluble solvents until their complete elimination from the paint layer.

Thus a solvent mixture consisting of 42 parts of xylene (insoluble in water)
42 parts methylene chloride
43 parts of butanol is eliminated completely from the paint layer. The film hardens under water more slowly than when water-soluble solvents are used, for example, in a week or so.

This discovery has prompted me to use in practice solvents which are very slightly soluble in water, e.g., toluene (solubility 0.047 g. at 16° C.) mixed with water-soluble solvents.

The use according to the invention of solvents which are insoluble, or only very slightly soluble, in water mixed with water soluble solvents has the advantage of increasing the stability of the solvent mixture under water and of making of the sub-aquatic application of the paint a great deal easier, which is thus carried out as easily as above-water painting.

In order to facilitate the application of the paint by brushing it is convenient to add to the paint linseed oil containing a drier such as a manganese-salt; the linseed oil acts also as plasticizer.

To paint iron surfaces covered by calamine film which cannot be eliminated by brushing, the paint must contain a certain amount of oleylamine-phosphate which makes the paint adhere to the above-mentioned surfaces.

It is an advantage if the paint is of a density greater than unity, so that it does not tend to float to the surface. Of course, the proportions of the ingredients of the paint may vary over a wide range according to the viscosity and covering power desired.

The paint may be applied by frogmen using brushes or by other convenient means, under fresh or salt water and, for example, upon iron which has been previously cleaned mechanically or upon concrete.

The following compositions in particular have given excellent results.

*Basic varnish formula*

| | Parts by weight |
|---|---|
| Isopropyl acetate | 400 |
| Methylene chloride | 600 |
| Toluene | 970 |
| Chlorinated rubber | 1500 |

Paint formula

| | Kg. |
|---|---|
| Basic varnish | 2 |
| Red lead | 1.1000 |
| Tricresyl phosphate | 0.225 |
| Oleylamine | 0.075 |
| Linseed oil | 0.130 |
| Manganese siccative | 0.040 |

A paint comprising:

| | Parts by weight |
|---|---|
| Chlorinated rubber | 240 |
| Isopropyl acetate | 270 |
| Methylene chloride | 90 |
| Amyl acetate | 30 |
| Chlorinated naphthalene | 30 |
| Oleylamine | 12 |
| Chlorinated plasticizer | 60 |
| Red lead | 500 |

I claim:

1. A paint composition adapted for application to underwater surfaces and consisting essentially of a solven-soluble film-forming material capable of hardening underwater upon solution of its solvent in water; at least one aliphatic amine having from 13 to 19 carbon atoms per molecule for causing said film to adhere to said surfaces and an organic solvent for said film-forming material consisting of at least two organic liquids, at least one of said liquids being substantially insoluble in water and at least one of said liquids being soluble in water, said organic solvent having a water solubility of at least 0.1 grams per litre, said solvent being capable of dissolving in water slowly enough to allow said film-forming material to form its film in a progressive and controlled manner.

2. A paint composition according to claim 1 wherein said film-forming material consists of a chlorinated rubber, the viscosity of which as measured on a Hoeppler viscometer lies between 17 and 55 centipoises at 20° C. for a 20% solution in a mixture of 95% toluene and 5% butanol.

3. A paint composition as claimed in claim 1 and having a specific gravity greater than 1.

4. A paint composition according to claim 1 wherein said amine is oleylamine and is present in an amount ranging from about 0.5% to 10% by weight of said composition.

5. A process for protecting under-water surfaces with covering material which can be applied under water and which will harden under water which comprises applying to a surface, while said surface is submerged in water, a paint having a film-forming material selected from the group consisting of chlorinated rubber and bitumen-chlorinated rubber mixture, an organic solvent for said film-forming material consisting of at least two organic liquids, at least one of said liquids being substantially insoluble in water and at least one of said liquids being soluble in water, said solvent being soluble in water to the extent of at least 0.1 g. per liter and thereby being effective to dissolve in water slowly enough to permit said film-forming material to form its film in a progressive, controlled manner, and an aliphatic amine.

6. A process for protecting under-water surfaces with covering material which can be applied under water and which will harden under water which comprises applying to a surface, while said surface is submerged in water, a paint having a film-forming material selected from the group consisting of chlorinated rubber and bitumen-chlorinated rubber mixture, a solvent for said film-forming material consisting of at elast two organic liquids, at least one of said liquids being substantially insoluble in water and at least one of said organic liquids being soluble in water, said solvent being soluble in water to the extent of at least 0.1 gram per liter and thereby being effective to dissolve in water slowly enough to permit said film-forming material to form its film in a progressive, controlled manner, and an amine selected from the group consisting of aliphatic amines having from 13 to 19 carbon atoms.

7. A paint comprising:

| | Parts by weight |
|---|---|
| Chlorinated rubber | 240 |
| Isopropyl acetate | 270 |
| Methylene chloride | 90 |
| Amyl acetate | 30 |
| Chlorinated naphthalene | 30 |
| Oleylamine | 12 |
| Chlorinated plasticizer | 60 |
| Red lead | 500 |

References Cited by the Examiner

UNITED STATES PATENTS

| | | | |
|---|---|---|---|
| 2,090,901 | 8/1937 | Rosenthal et al. | 260—736 |
| 2,118,787 | 5/1938 | Clayton et al. | 260—738 |
| 2,144,166 | 1/1939 | Roohadze | 260—738 |
| 2,225,303 | 12/1940 | Iliff et al. | 260—738 |
| 2,382,529 | 8/1945 | Auer | 260—736 |
| 2,384,270 | 9/1945 | Balassa | 260—738 |
| 2,415,775 | 2/1947 | Waldie | 260—738 |
| 2,572,252 | 10/1951 | Erasmus et al. | 260—738 |
| 2,647,060 | 7/1953 | Armstrong et al. | 260—738 |
| 2,717,245 | 9/1955 | Asaff | 260—738 |

FOREIGN PATENTS

| | | |
|---|---|---|
| 440,371 | 12/1935 | Great Britain. |
| 476,733 | 12/1937 | Great Britain. |
| 738,434 | 10/1932 | France. |

OTHER REFERENCES

"Armeens," Technical pamphlet of Armour Industrial Chemical Co., Chicago, Ill., 1954, p. 3 relied on.

MORRIS LIEBMAN, *Primary Examiner.*

DANIEL ARNOLD, *Examiner.*

R. S. STEWART, K. B. CLARKE, J. S. WALDRON,
*Assistant Examiners.*